Sept. 11, 1962 E. SCHUHKNECHT 3,053,301
LATERALLY CRIMPED WIRE TIRE INSERT
Filed March 24, 1960 2 Sheets-Sheet 1

INVENTOR
Ernst Schuhknecht
BY
Patent Agent

Sept. 11, 1962    E. SCHUHKNECHT    3,053,301
LATERALLY CRIMPED WIRE TIRE INSERT
Filed March 24, 1960    2 Sheets-Sheet 2

INVENTOR.
Ernst Schuhknecht
BY
*[signature]*
Patent Agent 3,053,301
LATERALLY CRIMPED WIRE TIRE INSERT
Ernst Schuhknecht, Rotestrasse 3, Stuttgart N, Germany
Filed Mar. 24, 1960, Ser. No. 17,340
Claims priority, application Germany Mar. 28, 1959
8 Claims. (Cl. 152—211)

The present invention relates to improvements in pneumatic tires for vehicles and more particularly to a pneumatic tire which is provided with U-shaped wire inserts which are embedded in the tread surface of the tire and are intended to increase the grip of the tire on the road. The invention further relates to a method of embedding such crimped wire inserts in a pneumatic tire.

The provision of pneumatic tires with U-shaped wire inserts for the same purpose as stated above is already known in the art. However, the known wire inserts were embedded in the tire in such a manner that the side arms thereof were disposed near the sides of the ribs forming the tread surface of the tire, and that the crimped part which connects the arms of two adjacent U-shaped wires at their outer ends was disposed closely underneath the tread surface of the tire. After the tire was used for a certain length of time and the tread surface was worn off to some extent, these outer connecting parts of the adjacent wire inserts were also ground off so that only the ends of these arms could continue to project to the tread surface of the tire. These remaining arms were then supposed to increase the grip of the tire on the road by extending vertically to the tread surface. It has, however, been found that this gripping effect is considerably diminished due to the fact that after the outer connecting parts are worn off, the remaining U-shaped arms will pivot in the direction of movement of the tire about their straight lower connecting webs which extend at right angles to the side arms and parallel to the axis of the tire. Instead of an effective gripping action, the pivoted free ends of the wire arms will at best exert a slight dragging or scrapping effect, and the pivoting arms will gradually cut into the material of the tire and damage the tire, and they will finally be torn entirely out of the tire and be lost.

It is an object of the present invention to overcome the above-mentioned disadvantages by providing the U-shaped wire inserts of a shape and in a manner so that the lower web which connects the two side arms of each insert will be embedded at the lowest possible point in the material of the tire and these side arms will extend at a substantially right angle to this lower web and substantially vertical to the tread surface of the tire. The wire inserts may be embedded in the tire either separately from each other or in the form of a continuous row of inserts which are connected to each other at their upper ends which are disposed in the tire at a point closely underneath or within the tread surface. The principal feature of the invention then consists in designing the lower connecting webs of the U-shaped wire inserts so that either some parts or all of them deviate from a straight line and from the plane in which the two side arms of each wire insert are located. This has the advantage that the lower connecting webs will be prevented from forming an axis about which the free side arms of the wire insert might pivot after the upper connecting parts between the adjacent inserts, if provided, have been worn off. Therefore, whether or not the inserts are embedded individually in the tire or whether they are originally connected to each other at their upper ends and their upper connecting parts are subsequently worn off, the side arms of each insert will always remain vertical to the tread surface and the ends thereof will continue to exert the desired grip on the road until they are worn off entirely, that is, at a time when the profile of the tire has also been worn off and the tire has to be recapped or replaced.

According to a preferred embodiment of the invention, the connecting web of the two side arms of each individual U-shaped wire insert is made of a substantially S-shaped form and the side arms extend at a substantially right angle to the plane of this connecting web. The connecting web, being crimped in several directions, then forms a solid base and counteracts the tendency of the side arms caused by the movement of the vehicle along a road, to pivot toward the rear of their radial direction.

The new method according to the invention of mounting the wire inserts in a tire consists in first embedding the inserts either individually or in the form of a row of interconnected inserts in a special strip of a suitable cross section and of a material similar to that of the tire, and in then embedding this strip with the wire inserts therein in the tread surface of the tire.

According to another feature of the invention these strips are made of an angular cross section, and they are inserted in grooves of a similar shape in the tread surface of the tire so that they will be firmly embedded therein. If desired, they may also be cemented to the walls of these grooves or be secured thereto by vulcanization. The wire-studded resilient strips are preferably made of a substantially dovetailed cross section and the grooves in the tread surface of the tire of a corresponding dovetailed shape, increasing in width from the tread surface toward the inside of the tire body. Furthermore, the resilient strip is preferably made in the form of a continuous ring of a suitable diameter so that, when this ring is mounted in the corresponding dovetailed groove, it will be firmly secured therein due to its resilient tension and the interlocking action of the dovetailed surfaces. Thus, even at very high speeds, there will be no danger that these rings will be thrown off the tire but they will remain firmly embedded therein.

The wire inserts according to the invention may be either embedded in a new tire in the course of its manufacture or even in a used tire when the same is being recapped.

These objects, features, and advantages of the present invention will become further apparent from the following detailed description thereof, particularly when read with reference to the accompanying drawings, in which.

Figure 9:
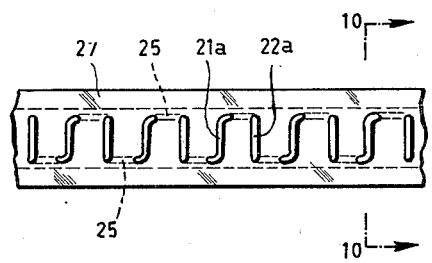
FIGURE 9 shows a bottom plan view of a strip of rubber or similar material of a substantially trapezoidal shape in which a row of interconnected wire inserts is embedded.
Figures 10, 11:
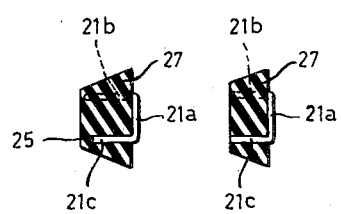
FIGURE 10 shows a cross section taken along line 10—10 of FIGURE 9.
FIGURE 11 shows a similar cross section of the rubber strip after it has been worn off to some extent.
Figure 12:
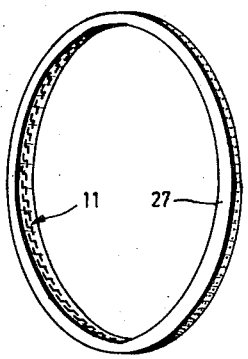
Figure 13:
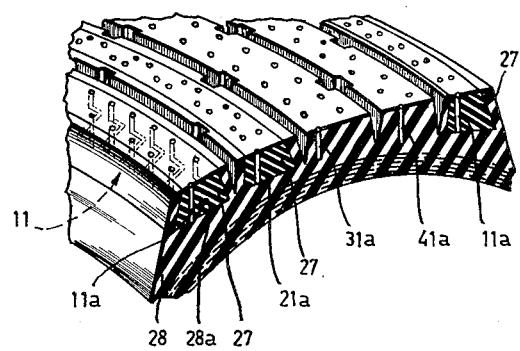

FIGURE 12 shows a perspective view of a rubber strip similar to that according to FIGURES 9 and 10 made in the form of a continuous ring and provided with individual wire inserts; while FIGURE 13 shows a perspective view of a section of a tire which is cut transversely and, for the purpose of illustration has trapezoidal rubber rings similar to that as shown in FIGURE 12 embedded therein and also has U-shaped wire inserts embedded directly in the material of the tire.

The U-shaped inserts according to the invention which are made of steel wire may be embedded either directly or indirectly into the outer layer of a pneumatic tire and extend to the tread surface of the tire to increase the grip thereof on the road.

Figure 1:
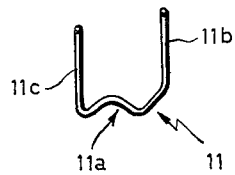
FIGURE 1 shows a perspective view of an individual U-shaped wire insert according to the invention.

The individual wire insert 11 as illustrated in FIGURE 1 is substantially U-shaped with the connecting bottom wire or web 11a being substantially S-shaped and the two side arms 11b and 11c of the U extending substantially vertically to the plane of the S-shaped connecting web 11a.

Figure 2:
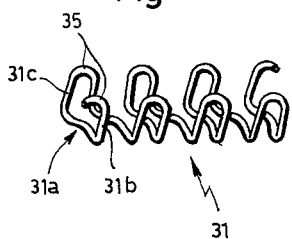
FIGURE 2 shows a perspective view of a continuous row of U-shaped wire inserts made of a single piece of steel wire.
Figure 3:
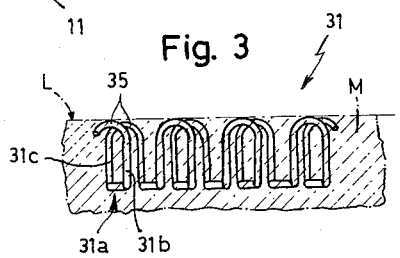
FIGURE 3 shows a side view of the row of wire inserts.
Figure 4:
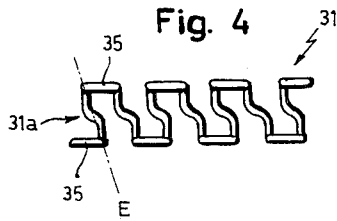
FIGURE 4 shows a top plan view thereof.

FIGURES 2 to 4 show a group 31 of wire inserts similar to that according to FIGURE 1 but integrally connected to each other and made of a single piece of wire which may be bent continuously to obtain a row of similar wire inserts of any desired length. Each individual U-shaped wire insert consists of an S-shaped web 31a which is connected at both ends thereof to the side arms 31b and 31c which extend vertically to the plane of the connecting web 31a and are connected by upper crimped portions 35 to the adjacent U-shaped inserts.

FIGURE 3 illustrates that the row of interconnected U-shaped inserts is embedded in the material M of a pneumatic tire so that the arms 31b and 31c of inserts 31 extend vertically to the tread surface L of the tire and the S-shaped connecting webs 31a are the most deeply embedded parts.

In FIGURE 4 it may be seen that in the continuous row of grips, due to the S-shaped form of the connecting webs 31a, the straight arms 31b and 31c are offset relative to each other within an oblique plane E.

Figure 5:
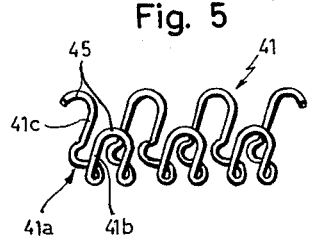
FIGURE 5 shows a perspective view of a row of interconnected wire inserts of a shape according to a modified embodiment of the invention.
Figure 6:
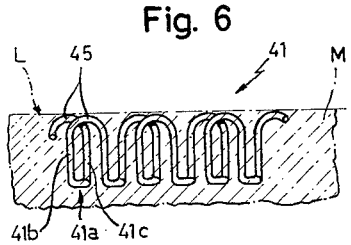
FIGURE 6 shows a side view of the row of inserts according to FIGURE 5.
Figure 8:
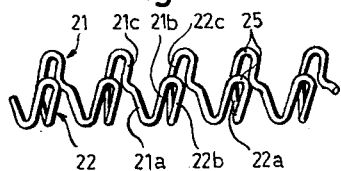
FIGURE 8 shows a row of interconnected U-shaped wire inserts according to a further modification of the invention, in which the adjacent inserts are of different shapes.
Figure 7:
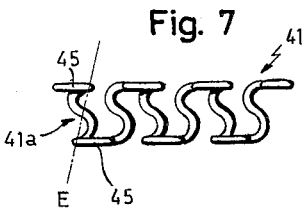
FIGURE 7 shows a top plan view thereof.

FIGURES 5 to 7 illustrate a few of a row of interconnected wire inserts 41 of a slightly different shape. Although the individual inserts are again substantially U-shaped, the connecting webs 41a thereof are of a more strongly curved S-shape. FIGURE 6 again indicates the manner and depth of embedding the row of inserts 41 in the material M of the tire with respect to the tread surface L thereof, while FIGURE 7 indicates by the line E the plane at which the individual arms 41b and 41c of each insert are offset relative to each other.

According to the modified shape of the individual wire inserts of the continuous row as illustrated in FIGURES 8 to 11, the adjacent inserts 21 and 22 of each connected pair differ from each other. While the vertical arms 21b and 22b at the opposite sides of the entire row of U-shaped inserts are of a substantially equal shape, the connecting web 21a of every second grip 21 is made of an S-shaped form and the connecting web 22a of the adjacent insert 22 is of a straight form. All adjacent inserts 21 and 22 are connected to each other by similar upper crimped portions 25.

FIGURES 9 to 11 illustrate the manner in which a row of interconnected wire inserts is embedded in a strip 27 which consists of a material similar to that of the body of the tire covering and is preferably made of a substantially trapezoidal cross section. The row of U-shaped inserts is embedded to such a depth in strip 27 that the connecting webs 21a and 22a of the grips rest on the wider surface of the trapezoid, while the crimped connecting portions 25 between the adjacent inserts lie within the material of strip 27 but closely adjacent to the narrower outer surface of the trapezoid, as shown particularly in FIGURE 10. After the tire has been worn off to some extent, as shown in FIGURE 11, the curved upper connecting portions 25 will also be worn off, but the sharp edges of the free ends of the remaining arms 21b, 21c, and 22b, 22c will exert a good grip upon the road surface. If individual wire inserts 11 as shown in FIGURE 1 are embedded in the body of the tire or in the trapezoidal strips 27, this gripping action by the sharp ends of the arms 11b and 11c will be exerted even when the tire is new. Under the pressure exerted upon the wire inserts by the surface of the road, those inserts with straight connecting webs 22a will be able to pivot about the axis of these parts within the elastic material of the tire or of the trapezoidal strip 27, while the S-shaped form of the adjacent connecting webs 11a, 21a, 31a, or 41a will prevent such a pivoting movement. This rigidifying effect will increase the more these S-shaped connecting webs deviate from the plane E passing through the arms of each U-shaped insert, as shown in FIGURES 4 and 7, and in the particular embodiments as shown in the drawings, this effect will be the strongest if the S-shaped connecting webs are curved as much as shown by webs 41a in FIGURES 5 to 7.

FIGURE 12 illustrates a complete trapezoidal ring 27 in which individual grips 11 according to FIGURE 1 are embedded.

The different manners in which the U-shaped inserts may be mounted in a tire section 28 are illustrated in FIGURE 13. Thus, at the left side of tire section 28 two trapezoidal rings 27 are embedded therein, while at the right side the U-shaped inserts are embedded directly in the tread layer of the tire. For receiving the trapezoidal rings 27, the tire 28 is provided with corresponding dovetailed grooves 28a extending around its periphery. Rings 27 are therefore securely mounted within grooves 28a because of their cross-sectional shape and also because, being continuous rings, they will snap through their own resilience into grooves 28a after the side walls of the latter have been sufficiently spread apart to receive the rings. If desired, rings 27 may, however, be additionally secured in grooves 28a by adhesive or by being vulcanized to the walls thereof.

Ring 27 at the extreme left of the tread surface of tire 28 according to FIGURE 13 is of the same type as shown in FIGURE 12 and therefore has individual U-shaped inserts 11 embedded therein. The next ring is provided with inserts 21 and 22 according to FIGURE 7, while the following rubber rib of tire 28 has a row of interconnected inserts 31 according to FIGURE 2 embedded directly therein. The next rubber rib contains a row of interconnected inserts 41 according to FIGURE 5, while the last rib at the right side again has a ring 27 according to FIGURE 12 with individual inserts 11 embedded therein.

Obviously, the different embodiments of the wire inserts and the different manners of embedding the same in a tire as shown in FIGURE 13 in the same tire 28 merely for the purpose of a simplified illustration. In actual practice it will rarely happen that several different types of inserts or different manners of embedding the same will be applied on the same tire, although obviously this may be done if desired for special reasons.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. In a pneumatic vehicle tire with tread strip: a plurality of U-shaped steel wire inserts embedded in said tread strip to increase the grip of the tire on the road, each of said inserts comprising a bottom wire representing that part of said insert which is embedded deepest in said tread strip, and also comprises two arms extending from the ends of said bottom wire in a direction substantially radially toward the tread strip surface, the major portion of said bottom wire being disposed in a first plane substantially perpendicular to a second plane containing said arms, said major portion of said bottom wire which lies in said first plane being so shaped that the larger part thereof is located a substantial distance laterally from the line of intersection of said planes to thereby provide a base for said arms that will inhibit tilting thereof when subjected to lateral forces.

2. A pneumatic vehicle tire according to claim 1, in which one arm of each U-shaped wire insert is integrally connected with the adjacent arm of the next U-shaped wire insert by a web disposed substantially at the tread surface of the tire.

3. In a pneumatic vehicle tire: a plurality of U-shaped steel wire inserts embedded in said tread strip to increase the grip of the tire on the road, each of said inserts comprising a bottom wire representing that part of the insert which is embedded deepest in said tread strip and also comprises two arms extending from the ends of said bottom wire in a substantially radial direction toward the tread strip surface, the bottom wire of at least alternate ones of said inserts being laterally offset from a plane containing said arms and the laterally offset portion of each bottom wire defining a plane substantially perpendicular to the plane of the pertaining arms thereby to provide a base for said arms that will inhibit tilting thereof under lateral forces.

4. In a pneumatic vehicle tire with tread strip: a plurality of U-shaped steel wire inserts embedded in said tread strip to increase the grip of the tire on the road, each of said inserts comprising a bottom wire representing that part of said insert which is embedded deepest in said tread strip, and also comprising two arms extending from the ends of said bottom wire in the direction toward the tread strip surface, said bottom wire being of a substantially S-shape with the portions of said S defining with each other a plane forming approximately a right angle with each of said arms.

5. In a pneumatic vehicle tire provided with a tread strip having a plurality of circumferential grooves therein: a plurality of insert strips of a material similar to that of the tire secured in said grooves, said grooves and said insert strips being dove-tailed for securing said strips in said grooves, a plurality of U-shaped steel wire inserts embedded in said insert strips to increase the grip of the tire on the road, each of said inserts comprising a bottom wire representing that part of said insert which is embedded deepest in said insert strips and also comprising two arms extending from the ends of said bottom wire in the direction substantially radially toward the tread strip surface, said bottom wire being offset laterally from a straight line joining the inner ends of said arms so as to form portions defining with each other a plane substantially perpendicular to a plane containing said arms, the major portions of said bottom wire being located in the said plane defined by said offset portions.

6. A pneumatic tire according to claim 5, in which said insert strips and the grooves receiving same have a substantially corresponding trapezoidal shape of a width increasing from the tread surface toward the bottom of said grooves.

7. In a pneumatic vehicle tire with tread strip: a plurality of U-shaped steel wire inserts embedded in said tread strip to increase the grip of the tire on the road, each of said inserts comprising a bottom wire representing that part of said insert which is embedded deepest in said tread strip, and also comprising two arms extending from the ends of said bottom wire rectilinearly and perpendicularly in the direction toward the tread strip surface, said bottom wire being of a substantially S-shape with the portions of said S defining with each other a plane forming approximately a right angle with each of said arms.

8. In a pneumatic vehicle tire with tread strip: a plurality of U-shaped steel wire inserts embedded in said tread strip to increase the grip of the tire on the road, each of said inserts comprising a bottom wire representing that part of said insert which is embedded deepest in said tread strip, and also comprising two arms extending from the ends of said bottom wire rectilinearly and perpendicularly in the direction toward the tread strip surface, said bottom wire with respect to a straight line joining the inner ends of said arms having at least a portion thereof non-linear thereby to form a base of substantial width for supporting said arms against tilting movement, said bottom wire in its entirety including the said non-linear portion thereof lying in a plane substantially perpendicular to a plane containing said arms.

References Cited in the file of this patent
UNITED STATES PATENTS

| | | |
|---|---|---|
| 1,021,171 | Ward | Mar. 26, 1912 |
| 1,814,340 | Shelton et al. | July 14, 1931 |
| 2,102,784 | Bridges | Dec. 21, 1937 |
| 2,479,474 | Crooker | Aug. 16, 1949 |
| 2,568,542 | Friestedt | Sept. 18, 1951 |
| 2,600,506 | Kimes | June 17, 1952 |
| 2,904,878 | Kimes | Sept. 22, 1959 |